(12) United States Patent
Nakazawa et al.

(10) Patent No.: US 10,131,564 B2
(45) Date of Patent: Nov. 20, 2018

(54) GLASS PLATE SEPARATING APPARATUS

(71) Applicant: KAWASAKI JUKOGYO KABUSHIKI KAISHA, Kobe-shi, Hyogo (JP)

(72) Inventors: Mutsuhiro Nakazawa, Kobe (JP); Takanori Kiritoshi, Kobe (JP); Osami Oogushi, Kobe (JP); Keiji Tsujita, Kobe (JP); Tadaoki Yabuuchi, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 131 days.

(21) Appl. No.: 15/305,965

(22) PCT Filed: Jun. 2, 2015

(86) PCT No.: PCT/JP2015/002779
§ 371 (c)(1),
(2) Date: Oct. 21, 2016

(87) PCT Pub. No.: WO2015/186350
PCT Pub. Date: Dec. 10, 2015

(65) Prior Publication Data
US 2017/0057863 A1    Mar. 2, 2017

(30) Foreign Application Priority Data

Jun. 6, 2014   (JP) ................................ 2014-117597

(51) Int. Cl.
*C03B 33/09*    (2006.01)
*C03B 17/06*    (2006.01)
(Continued)

(52) U.S. Cl.
CPC .............. *C03B 33/09* (2013.01); *B26F 3/002* (2013.01); *B26F 3/08* (2013.01); *B28D 1/221* (2013.01);
(Continued)

(58) Field of Classification Search
CPC ......... A61K 31/585; B26F 3/002; B26F 3/08; B28D 1/221; B65G 2249/04;
(Continued)

(56) References Cited

U.S. PATENT DOCUMENTS 3,584,773 A * 6/1971 Grove ..................... C03B 33/09
225/2
2008/0264994 A1* 10/2008 Herve ................. C03B 33/0215
225/2

FOREIGN PATENT DOCUMENTS

JP    2005-187283 A    7/2005
JP     5201774 B2      6/2013
(Continued)

OTHER PUBLICATIONS

Aug. 25, 2015 International Search Report issued in International Patent Application No. PCT/JP2015/002779.
(Continued)

*Primary Examiner* — Stephen Choi
(74) *Attorney, Agent, or Firm* — Oliff PLC

(57) ABSTRACT

A glass plate separating apparatus, as one example, includes: a trigger device that forms a start point flaw in a first main surface of a glass ribbon on a division-planned line; a pair of holding members disposed at the first main surface side of the glass ribbon; and a heater disposed at a second main surface side of the glass ribbon. The pair of holding members, each of which extends parallel to the division-planned line, is brought into contact with the glass ribbon at both sides of the division-planned line while being lowered (Continued)

together with the glass ribbon. The heater extends along the division-planned line, and is brought into contact with and pressed onto the glass ribbon on the division-planned line while being lowered together with the glass ribbon.

9 Claims, 17 Drawing Sheets

(51) Int. Cl.
*B28D 5/00* (2006.01)
*B26F 3/00* (2006.01)
*B26F 3/08* (2006.01)
*B28D 1/22* (2006.01)
*C03B 33/02* (2006.01)
*C03B 33/033* (2006.01)

(52) U.S. Cl.
CPC ...... *C03B 33/0215* (2013.01); *B65G 2249/04* (2013.01); *C03B 33/033* (2013.01)

(58) Field of Classification Search
CPC ... C03B 33/0215; C03B 33/033; C03B 33/09; G06Q 30/0201; G06Q 30/0246
See application file for complete search history.

(56) References Cited

FOREIGN PATENT DOCUMENTS

| | | |
|---|---|---|
| JP | 5235987 B2 | 7/2013 |
| KR | 2001-0014665 A | 2/2001 |
| KR | 2010-0123665 A | 11/2010 |
| WO | 2015/004835 A1 | 1/2015 |

OTHER PUBLICATIONS

Dec. 6, 2016 International Preliminary Report on Patentability issued in International Patent Application No. PCT/JP2015/002779.

* cited by examiner

GLASS PLATE SEPARATING APPARATUS

TECHNICAL FIELD

The present invention relates to an apparatus for separating a glass plate from a glass ribbon obtained by a down-draw technique.

BACKGROUND ART

Patent Literature 1 discloses a glass plate separating apparatus 100 as shown in FIG. 17, which is one example of an apparatus for separating a glass plate from a glass ribbon obtained by a down-draw technique. The glass plate separating apparatus 100 includes a scoring device 120 and an engaging device 130. The scoring device 120 forms a scoring line on a first main surface of a glass ribbon 110 over the entire width of the first main surface, and the engaging device 130 applies a bending moment to the glass ribbon 110 while sucking a second main surface of the glass ribbon 110. As a result, the scoring line opens up and extends through the glass ribbon, and thereby a glass plate 111 is separated from the glass ribbon 110.

The scoring device 120 is, for example, a mechanical cutter such as a diamond cutter or cemented carbide wheel. According to Patent Literature 1, a laser system can also be used as the scoring device 120. For example, Patent Literature 2 discloses a glass plate separating apparatus for forming a scoring line on a glass ribbon by running a light emitting element that emits laser light.

CITATION LIST

Patent Literature

PTL 1: Japanese Patent Publication No. 5201774
PTL 2: Japanese Patent Publication No. 5235987

SUMMARY OF INVENTION

Technical Problem

In a case where a mechanical cutter is used as the scoring device, cullet is generated when the scoring line is formed by the scoring device. Since the cullet adheres to the surface of the glass ribbon, a clean glass plate cannot be obtained. In the case of running a light emitting element that emits laser light as disclosed in Patent Literature 2, there is a durability problem since the light emitting element is an ultra-precision device and is weak against vibration.

In view of the above, an object of the present invention is to provide a glass plate separating apparatus capable of separating a glass plate from a glass ribbon without forming a scoring line on the glass ribbon.

Solution to Problem

In order to solve the above-described problems, a glass plate separating apparatus according to one aspect of the present invention is an apparatus for separating a glass plate from a glass ribbon obtained by a down-draw technique, the apparatus including: a trigger device that forms a start point flaw in a first main surface of the glass ribbon on a division-planned line; a pair of holding members disposed at the first main surface side of the glass ribbon, each holding member extending parallel to the division-planned line; a first driver that brings the pair of holding members into contact with the glass ribbon at both sides of the division-planned line while lowering the pair of holding members together with the glass ribbon; a heater disposed at a second main surface side of the glass ribbon, the second main surface facing opposite the first main surface, the heater extending along the division-planned line; a second driver that, while lowering the heater together with the glass ribbon, brings the heater into contact with the glass ribbon on the division-planned line such that a tensile thermal stress is generated on the first main surface of the glass ribbon, and presses the heater onto the glass ribbon such that a tensile stress derived from a bending moment and the tensile thermal stress are combined on the first main surface of the glass ribbon to divide the glass ribbon along the division-planned line; and a discharger that discharges the glass plate separated from the glass ribbon as a result of dividing the glass ribbon from directly below the glass ribbon.

According to the above configuration, by bringing the heater into contact with the second main surface of the glass ribbon, a tensile thermal stress is generated on the first main surface owing to a temperature difference between the second main surface and the first main surface. In addition, by pressing the heater onto the glass ribbon between the pair of holding members, a bending moment is caused to act on the glass ribbon. As a result, on the first main surface, a tensile stress derived from the bending moment is combined with the tensile thermal stress. Consequently, a crack progresses along the division-planned line from the start point flaw formed in the first main surface, and the glass ribbon is divided. Thus, according to the glass plate separating apparatus of the present invention, the glass plate can be separated from the glass ribbon without forming a scoring line on the glass ribbon.

The above glass plate separating apparatus may further include a cooling device disposed between the pair of holding members and extending along the division-planned line, the cooling device being brought into contact with the glass ribbon on the division-planned line when the heater is brought into contact with the glass ribbon. According to this configuration, a temperature gradient between the second main surface and the first main surface can be made steep, and thereby a greater tensile thermal stress can be generated.

A glass plate separating apparatus according to another aspect of the present invention is an apparatus for separating a glass plate from a glass ribbon obtained by a down-draw technique, the apparatus including: a trigger device that forms a start point flaw in a first main surface of the glass ribbon on a division-planned line; a pair of holding members disposed at the first main surface side of the glass ribbon, each holding member extending parallel to the division-planned line; a first driver that brings the holding members into contact with the glass ribbon at both sides of the division-planned line while lowering the holding members together with the glass ribbon; a pressing member disposed at a second main surface side of the glass ribbon, the second main surface facing opposite the first main surface, the pressing member extending along the division-planned line; a cooling device disposed between the pair of holding members and extending along the division-planned line, the cooling device being brought into contact with the glass ribbon on the division-planned line to generate a tensile thermal stress on the first main surface of the glass ribbon; a second driver that, while lowering the pressing member together with the glass ribbon, presses the pressing member onto the glass ribbon on the division-planned line such that a tensile stress derived from a bending moment and the tensile thermal stress are combined on the first main surface of the glass ribbon to divide the glass ribbon along the division-planned line; and a discharger that discharges the glass plate separated from the glass ribbon as a result of dividing the glass ribbon from directly below the glass ribbon.

According to the above configuration, by bringing the cooling device into contact with the first main surface of the glass ribbon, a tensile thermal stress is generated on the first main surface owing to a temperature difference between the first main surface and the second main surface. In addition, by pressing the pressing member onto the glass ribbon between the pair of holding members, a bending moment is caused to act on the glass ribbon. As a result, on the first main surface, a tensile stress derived from the bending moment is combined with the tensile thermal stress. Consequently, a crack progresses along the division-planned line from the start point flaw formed in the first main surface, and the glass ribbon is divided. Thus, according to the glass plate separating apparatus of the present invention, the glass plate can be separated from the glass ribbon without forming a scoring line on the glass ribbon.

The above glass plate separating apparatus may further include a retainer that retains the separated glass plate and lowers the separated glass plate at a higher speed than a falling speed of the glass ribbon. The discharger may discharge the glass plate lowered by the retainer. This configuration makes it possible to move the separated glass plate away from the glass ribbon immediately.

The above glass plate separating apparatus may further include a pair of guide mechanisms that guides the glass plate when the glass plate is lowered by the retainer, the guide mechanisms moving between guide positions at which the guide mechanisms contact the glass plate and retraction positions at which the guide mechanisms are spaced apart from the glass plate. According to this configuration, the glass plate can be lowered at a high speed owing to the guiding by the guide mechanisms. Also, by moving the guide mechanisms to the retraction positions, the glass plate can be discharged by the discharger.

Advantageous Effects of Invention

The present invention makes it possible to separate the glass plate from the glass ribbon without forming a scoring line on the glass ribbon.

DESCRIPTION OF EMBODIMENTS

Embodiment 1

Figure 1:
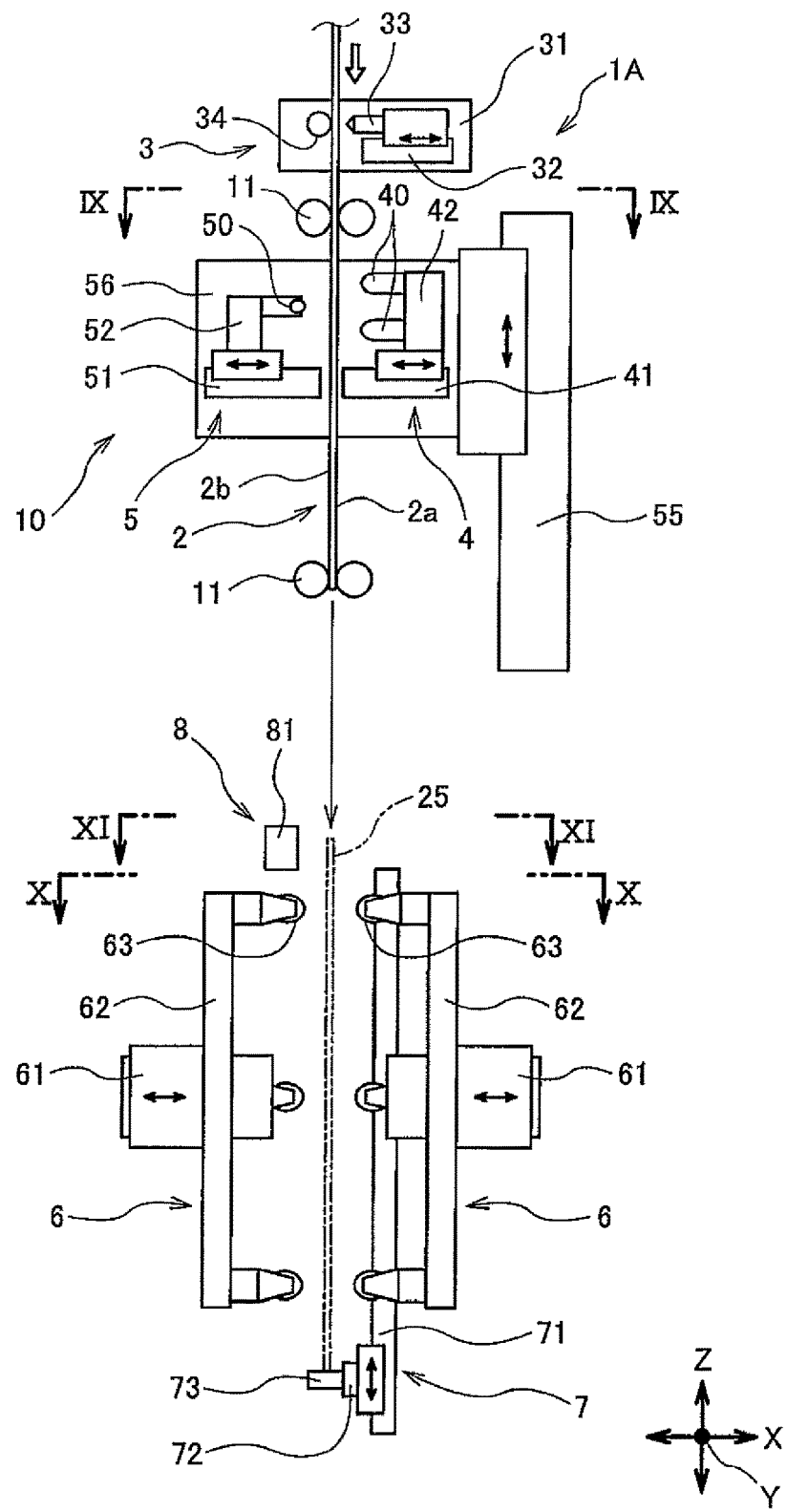
FIG. 1 is a side view of a glass plate separating apparatus according to Embodiment 1 of the present invention.

FIG. 1 shows a glass plate separating apparatus 1A according to Embodiment 1 of the present invention. The glass plate separating apparatus 1A separates a glass plate 25 from a glass ribbon 2 obtained by a down-draw technique. The glass plate separating apparatus 1A is disposed directly below a fusion apparatus that causes molten glass to overflow and traction rollers (both the fusion apparatus and the traction rollers are not shown).

Figure 8:
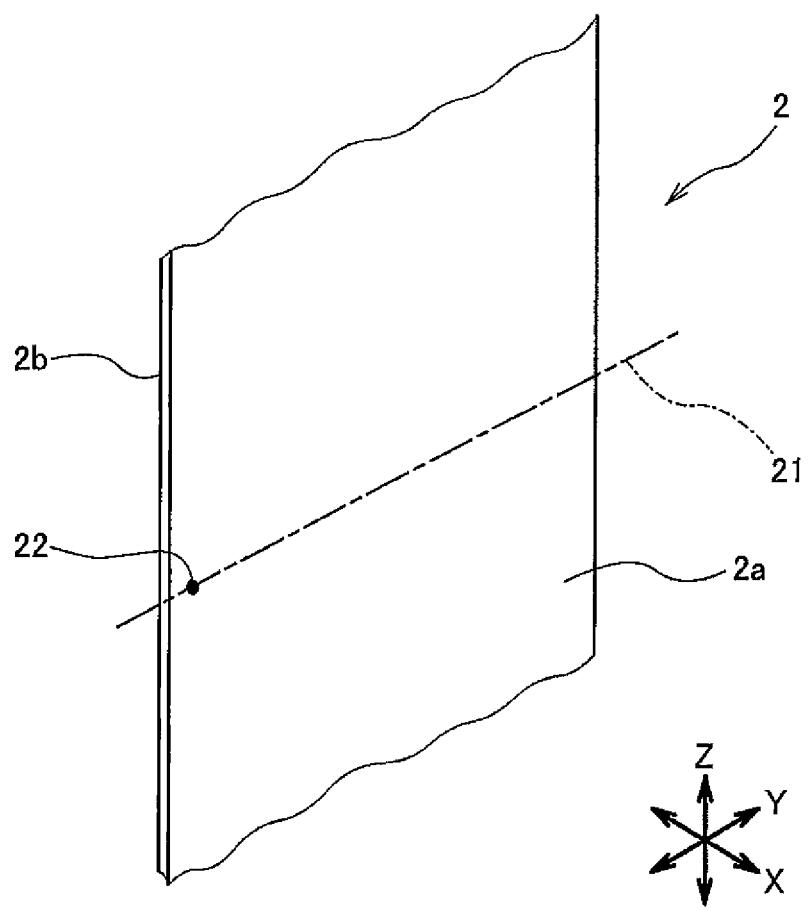
FIG. 8 is a perspective view of a glass ribbon.

Specifically, the glass plate separating apparatus 1A includes: a plurality of (in the example shown in FIG. 1, two) pairs of rollers 11, which guide the falling glass ribbon 2; a divider 10, which divides the glass ribbon 2 along an imaginary division-planned line 21 shown in FIG. 8; and a trigger device 3 disposed above the divider 10. The glass plate separating apparatus 1A further includes a pair of guide mechanisms 6, a retainer 7, and a discharger 8, which are disposed below the divider 10.

The glass ribbon 2 has a first main surface 2a and a second main surface 2b, which face opposite each other. When the glass ribbon 2 reaches the glass plate separating apparatus 1A, the temperature of the glass ribbon 2 is about 100 to 300° C., for example. As shown in FIG. 8, the division-planned line 21 is parallel to the width direction of the glass ribbon 2. Hereinafter, for the sake of convenience of the description, the vertical direction, in which the glass ribbon 2 falls, is occasionally referred to as the Z-direction; the thickness direction of the glass ribbon 2 is occasionally referred to as the X-direction; and the width direction of the glass ribbon 2 is occasionally referred to as the Y-direction.

The trigger device 3 forms a minute start point flaw 22 in the first main surface 2a of the glass ribbon 2 on the division-planned line 21 (see FIG. 8). The term "minute" herein refers to the size of the flaw, which is up to several millimeters (e.g., 5 mm). The start point flaw 22 may be a dotted flaw or may be a linear flaw. It is desirable that the start point flaw 22 be formed in an end portion of the glass ribbon 2. The reason for this is that, by forming the start point flaw 22 in an end portion of the glass ribbon 2, the glass ribbon 2 can be divided in a manner to cleave the glass ribbon 2 from the end portion where the start point flaw 22 is formed, and thereby the glass plate 2 can be smoothly divided along the division-planned line 21. The "end portion of the glass ribbon 2" herein refers to each of both non-middle portions of the glass ribbon 2 when the glass ribbon 2 is equally trisected in the width direction of the glass ribbon 2.

To be more specific, as shown in FIG. 1, the trigger device 3 includes: a flaw forming tool 33 with a pointed distal end; an X-axis mechanism 32, which moves the flaw forming tool 33 in the X-direction; and a body 31, which supports the X-axis mechanism 32. The body 31 also supports a reaction force receiving roller 34, which is disposed opposite the flaw forming tool 33 with respect to the glass ribbon 2.

In the present embodiment, the divider 10 includes a heater 50, which heats the glass ribbon 2. The heater 50 is disposed at the second main surface 2b side of the glass ribbon 2. The divider 10 further includes a pair of holding members 40 disposed at the first main surface 2a side of the glass ribbon 2. In the Z-direction, the heater 50 is positioned substantially at the center between the pair of holding members 40. The divider 10 further includes: a first driver 4, which drives the holding members 40; and a second driver 5, which drives the heater 50.

Figure 9:
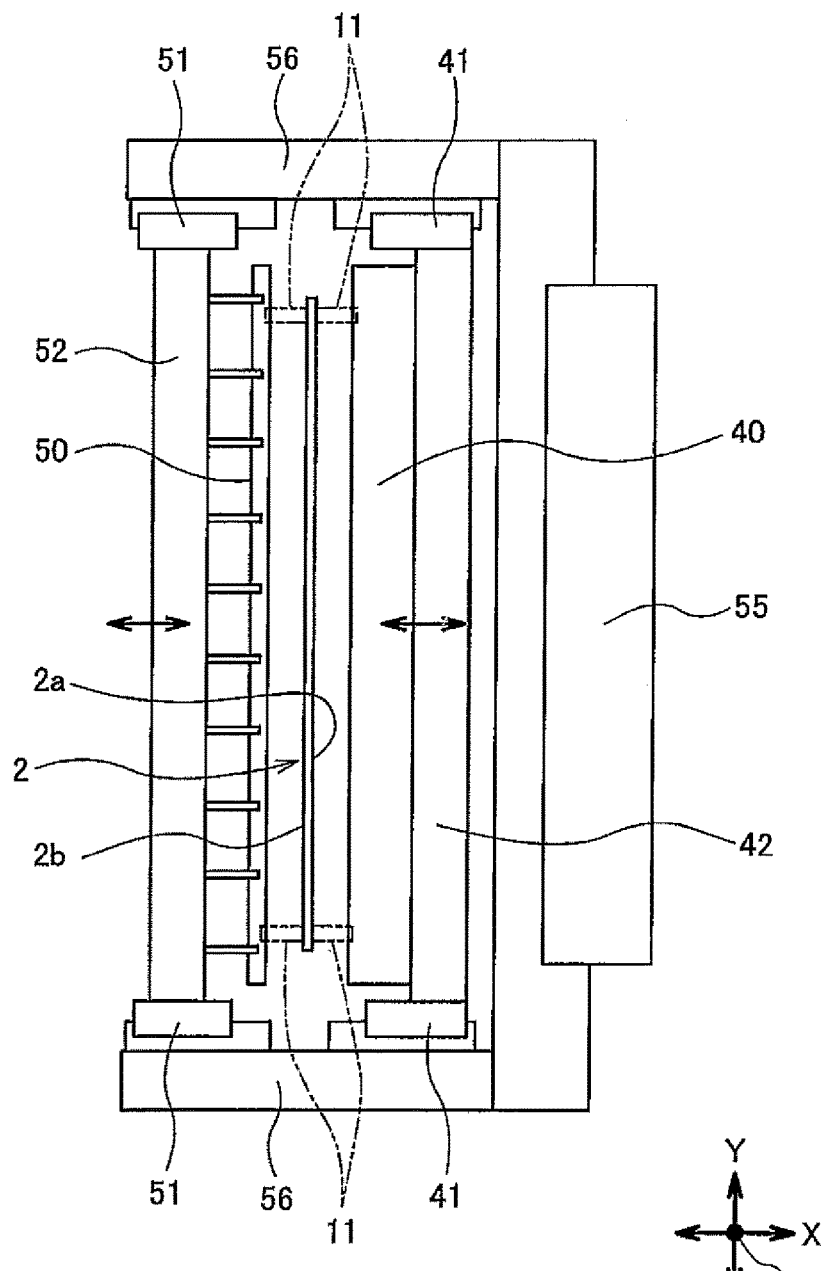
FIG. 9 shows a view as seen from line IX-IX of FIG. 1.

As shown in FIG. 9, each of the holding members 40 extends parallel to the division-planned line 21 (i.e., extends in the Y-direction). The holding members 40 serve to receive reaction force that is generated when the heater 50 is pressed onto the glass ribbon 2 as described below.

The heater 50 also extends along the division-planned line 21 (i.e., extends in the Y-direction). The heater 50 is configured to keep its temperature to be higher than the temperature of the glass ribbon 2. For example, since the temperature of the glass ribbon 2 is, as one example, about 100 to 300° C. as mentioned above, the temperature of the heater 50 is, as one example, about 200 to 500° C. In one example, the temperature difference between the heater 50 and the glass ribbon 2 is 100° C. or more. A sheathed heater can be used as the heater 50, for example.

As shown in FIG. 1 and FIG. 9, the first driver 4 driving the holding members 40 includes: two X-axis mechanisms 41, which move the holding members 40 in the X-direction; and a Z-axis mechanism 55, which moves the holding members 40 in the Z-direction. Any of various linear motion mechanisms, such as a ball screw mechanism or hydraulic or pneumatic cylinder, can be used as each of the X-axis mechanisms 41 and the Z-axis mechanism 55. In the present embodiment, the Z-axis mechanism 55 is disposed at the first main surface 2a side of the glass ribbon 2. A pair of arms 56 protrudes from a movable part of the Z-axis mechanism 55, passing by the glass ribbon 2 to the second main surface 2b side. The X-axis mechanisms 41 are attached to the pair of arms 56. A supporting member 42, which supports the holding members 40, is provided in a manner to bridge between movable parts of the X-axis mechanisms 41. However, as an alternative, only one X-axis mechanism 41 may be provided between the supporting member 42 and the Z-axis mechanism 55.

The second driver 5 driving the heater 50 includes: two X-axis mechanisms 51, which move the heater 50 in the X-direction; and the Z-axis mechanism 55, which moves the heater 50 in the Z-direction. That is, the Z-axis mechanism 55 is shared by the first driver 4 and the second driver 5. However, as an alternative, a Z-axis mechanism dedicated for the second driver 5 may be disposed at the second main surface side of the glass ribbon 2. In this case, only one X-axis mechanism 51 may be provided between the Z-axis mechanism and a supporting member 52 described below.

Any of various linear motion mechanisms, such as a ball screw mechanism or hydraulic or pneumatic cylinder, can be used as each of the X-axis mechanisms 51. In the present embodiment, the X-axis mechanisms 51 are attached to the pair of arms 56. The supporting member 52, which supports the heater 50, is provided in a manner to bridge between movable parts of the X-axis mechanisms 51.

Figure 10:
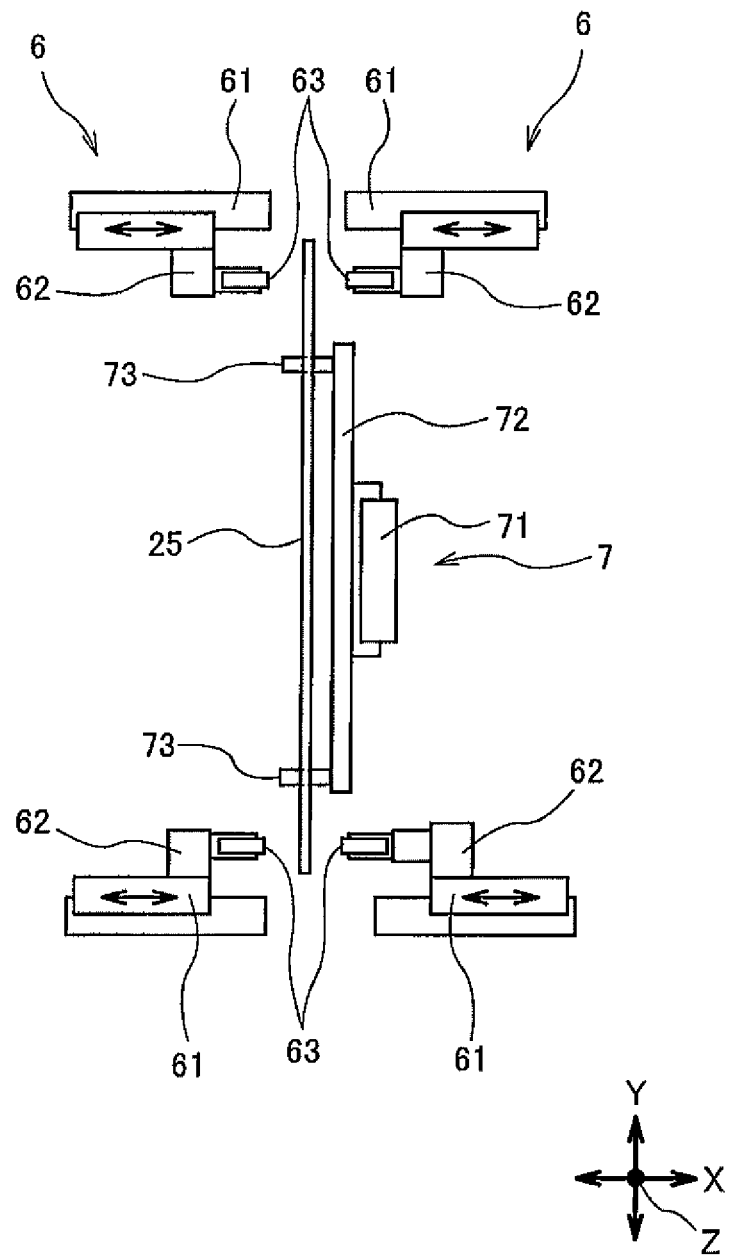
FIG. 10 shows a view as seen from line X-X of FIG. 1.

As shown in FIG. 1 and FIG. 10, the retainer 7 disposed below the divider 10 retains the glass plate 25, which is separated from the glass ribbon 2 by the dividing by the divider 10, and lowers the glass plate 25 at a higher speed than the falling speed of the glass ribbon 2. The retainer 7 includes: a plurality of (in the illustrated example, two) supporting members 73, which support the glass plate 25; and a Z-axis mechanism 71, which moves the supporting members 73 in the Z-direction. The supporting members 73 are small supporting pieces spaced apart from each other in the Y-direction, and are fixed to a movable part of the Z-axis mechanism 71 via a base 72. However, as an alternative, an elongated plate extending in the Y-direction may be used as the supporting member 73.

The pair of guide mechanisms 6 guides the glass plate 25 when the glass plate 25 is lowered by the retainer 7. As shown in FIG. 1 and FIG. 10, each guide mechanism 6 includes: a plurality of guide rollers 63, which are arranged in two lines so as to come into contact with both end portions of the glass plate 25; supporting members 62, which support the respective lines of guide rollers 63; and X-axis mechanisms 61, which move the supporting members 62 in the X-direction, respectively. It should be noted that if the supporting members 62 in each guide mechanism 6 are coupled together by a coupling member, each guide mechanism 6 may be provided with only one X-axis mechanism 61. The X-axis mechanisms 61 move the guide mechanisms 6 between guide positions at which the guide mechanisms 6 contact the glass plate 25 and retraction positions at which the guide mechanisms 6 are spaced apart from the glass plate 25.

Figure 11:
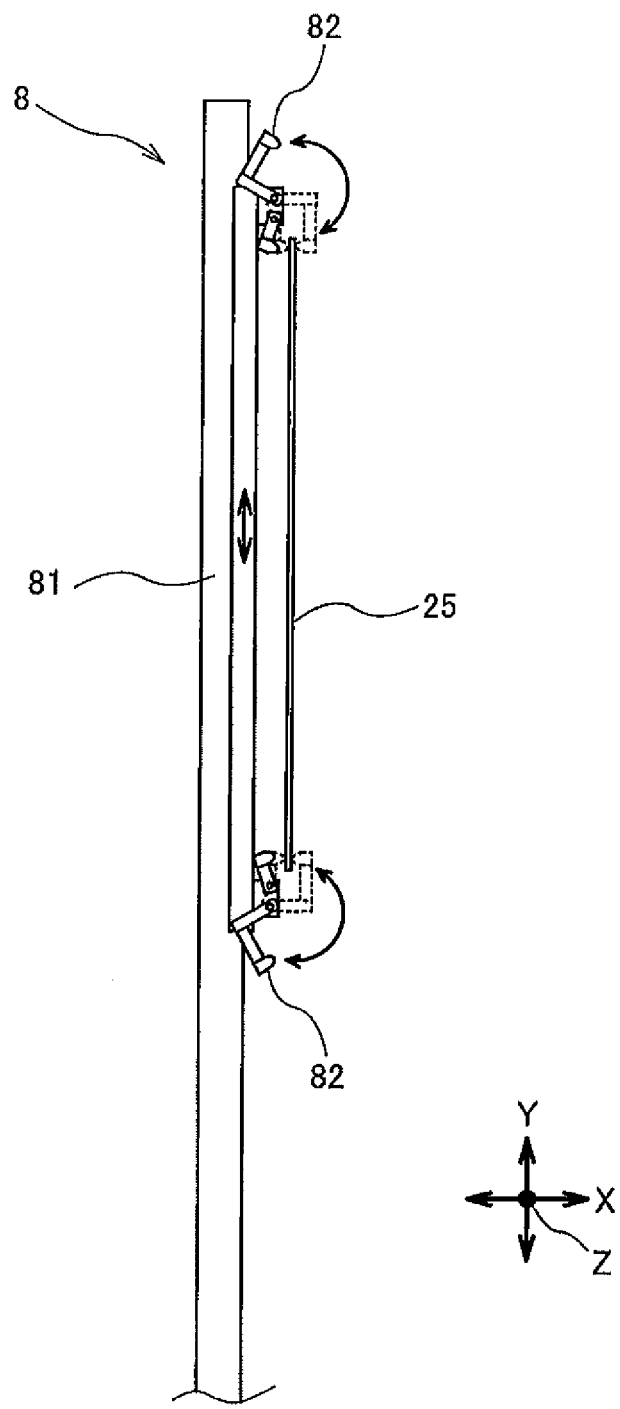
FIG. 11 shows a view as seen from line XI-XI of FIG. 1.

As shown in FIG. 1 and FIG. 11, the discharger 8 disposed below the divider 10 discharges the glass plate 25, which is lowered by the retainer 7, from directly below the glass ribbon 2. In the present embodiment, the discharger 8 adopts a Y-axis mechanism 81, which moves the glass plate in the Y-direction. A pair of chuck devices 82 is provided on a movable part of the Y-axis mechanism 81. Since edges of the glass plate 25 in the Y-direction are to be cut away and discarded in a subsequent step, the chuck devices 82 chuck the edges.

Although not illustrated, the glass plate separating apparatus 1A includes a controller that controls the above-described various devices. The rotation speed of the traction rollers, which are disposed upstream of the glass plate separating apparatus 1A and which are not shown, is inputted into the controller. Based on the falling speed of the glass ribbon 2, which is calculated from the rotation speed of the traction rollers, and the position of the division-planned line 21, which is obtained based on the falling speed of the glass ribbon 2, the controller controls the above-described various devices.

Next, operations of the glass plate separating apparatus 1A are described with reference to FIG. 2 to FIG. 7.

(1) Start Point Flaw Forming Step

Figure 2:
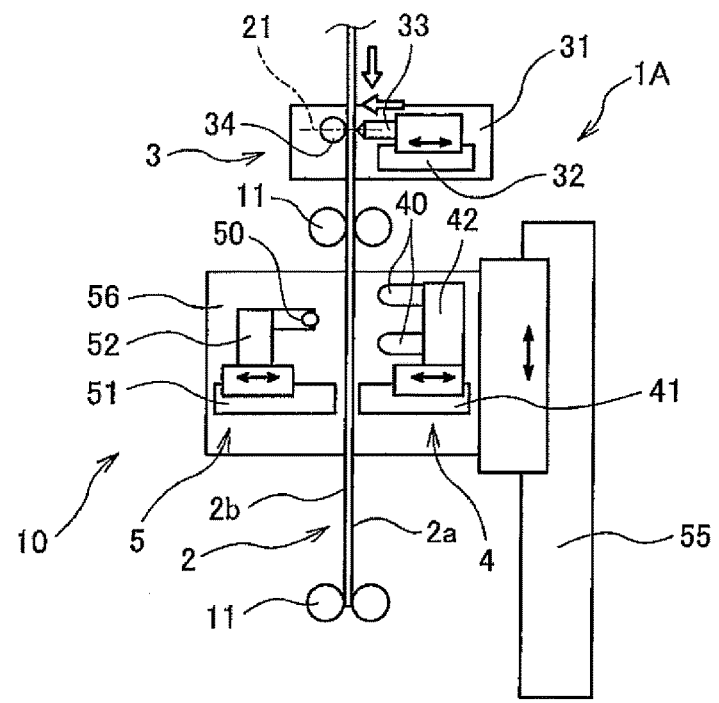
FIG. 2 shows an operation of the glass plate separating apparatus shown in FIG. 1.
Figure 2:
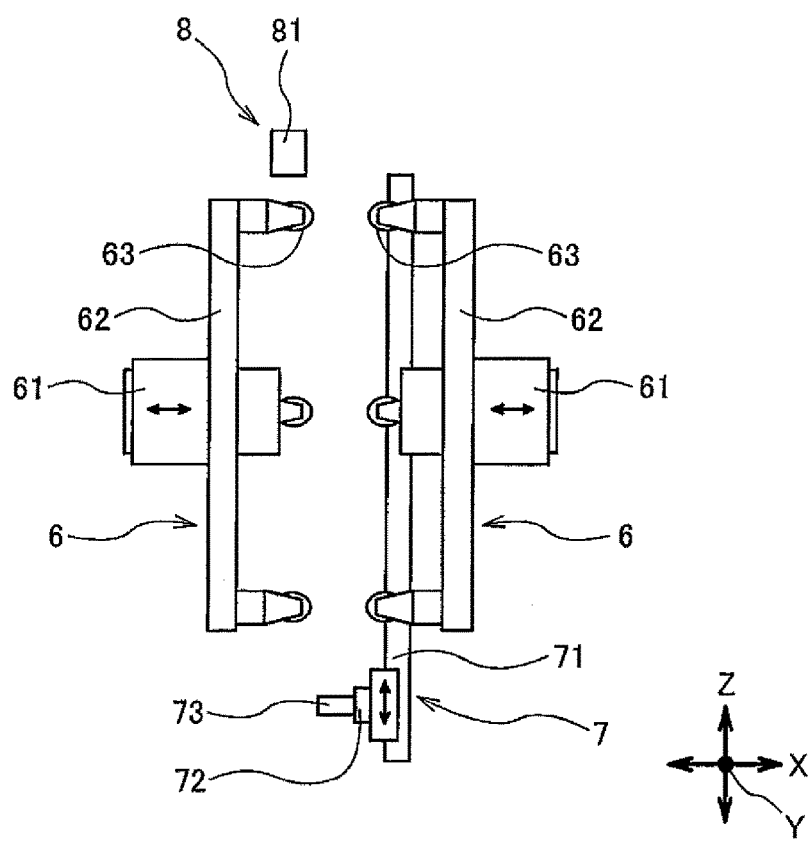

As shown in FIG. 2, the glass plate separating apparatus 1A stands by until the division-planned line 21 coincides with the height position of the trigger device 3, i.e., stands by until the length from the lower end of the glass ribbon 2 from which the glass plate 25 has been separated by the most recently performed division to the height position of the trigger device 3 becomes an intended length. When the division-planned line 21 has coincided with the height position of the trigger device 3, the X-axis mechanism 32 of the trigger device 3 moves the flaw forming tool 33 forward. As a result, a minute start point flaw 22 is formed in the first main surface 2a of the glass ribbon 2. Then, the X-axis mechanism 32 moves the flaw forming tool 33 backward.

(2) Dividing Step

Figure 3:
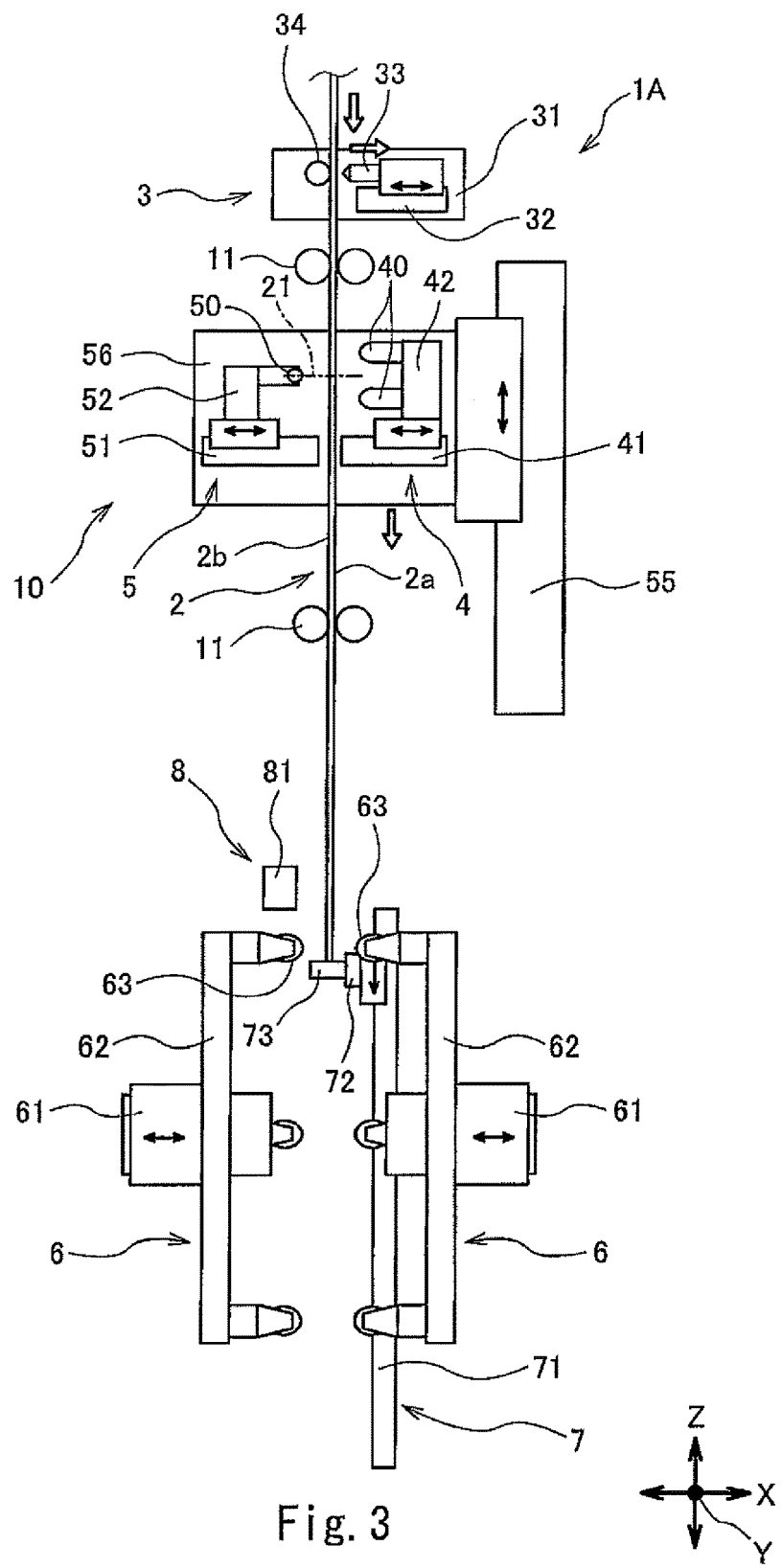
FIG. 3 shows an operation of the glass plate separating apparatus shown in FIG. 1.

Thereafter, as shown in FIG. 3, when the division-planned line 21 has coincided with the height position of the heater 50, the Z-axis mechanism 55 shared by the first driver 4 and the second driver 5 lowers the heater 50 and the pair of holding members 40 together with the glass ribbon 2 (i.e., at the same speed as the falling speed of glass ribbon 2). Further, as shown in FIG. 4, the X-axis mechanisms 41 of the first driver 4 move the holding members 40 forward to bring the holding members 40 into contact with the first main surface 2a of the glass ribbon 2 at both sides of the division-planned line 21, and also, the X-axis mechanisms 51 of the second driver 5 move the heater 50 forward to bring the heater 50 into contact with the second main surface 2b of the glass ribbon 2 on the division-planned line 21.

When the heater 50 has come into contact with the second main surface 2b of the glass ribbon 2, the second main surface 2b is heated along the division-planned line 21. As a result, owing to a temperature difference between the second main surface 2b and the first main surface 2a, a compressive thermal stress derived from thermal expansion is generated on the second main surface 2b along the division-planned line 21, and a tensile thermal stress derived from reaction force of the thermal expansion is generated on the first main surface 2a.

Figure 5:
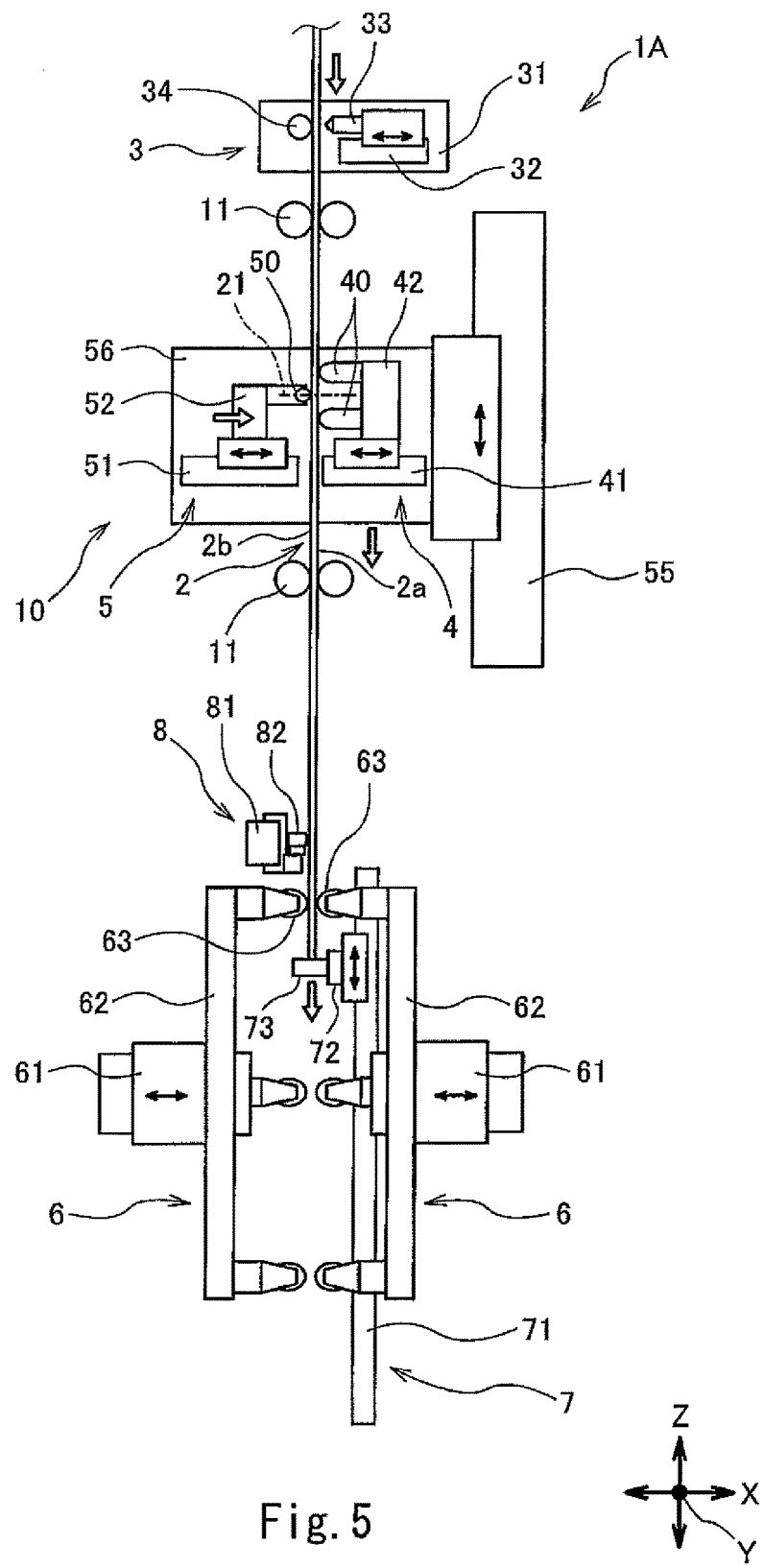
FIG. 5 shows an operation of the glass plate separating apparatus shown in FIG. 1.

Subsequently, while the temperature difference between the second main surface 2b and the first main surface 2a of the glass ribbon 2 is kept great, i.e., before the temperature of the first main surface 2a becomes close to the temperature of the second main surface 2b due to thermal conduction, the X-axis mechanisms 51 of the second driver 5 move the heater 50 further forward as shown in FIG. 5 to press the heater 50 onto the glass ribbon 2 on the division-planned line 21. As a result, a bending moment is caused to act on the glass ribbon 2, and on the first main surface 2a, a tensile stress derived from the bending moment is combined with the tensile thermal stress, which results from the thermal expansion. Consequently, a crack progresses along the division-planned line 21 from the start point flaw 22 formed in the first main surface 2a, and the glass ribbon 2 is divided along the division-planned line 21. In addition, owing to these stresses, the glass ribbon 2 is divided apart instantly (e.g., in about 1 to 3 seconds).

Figure 4:
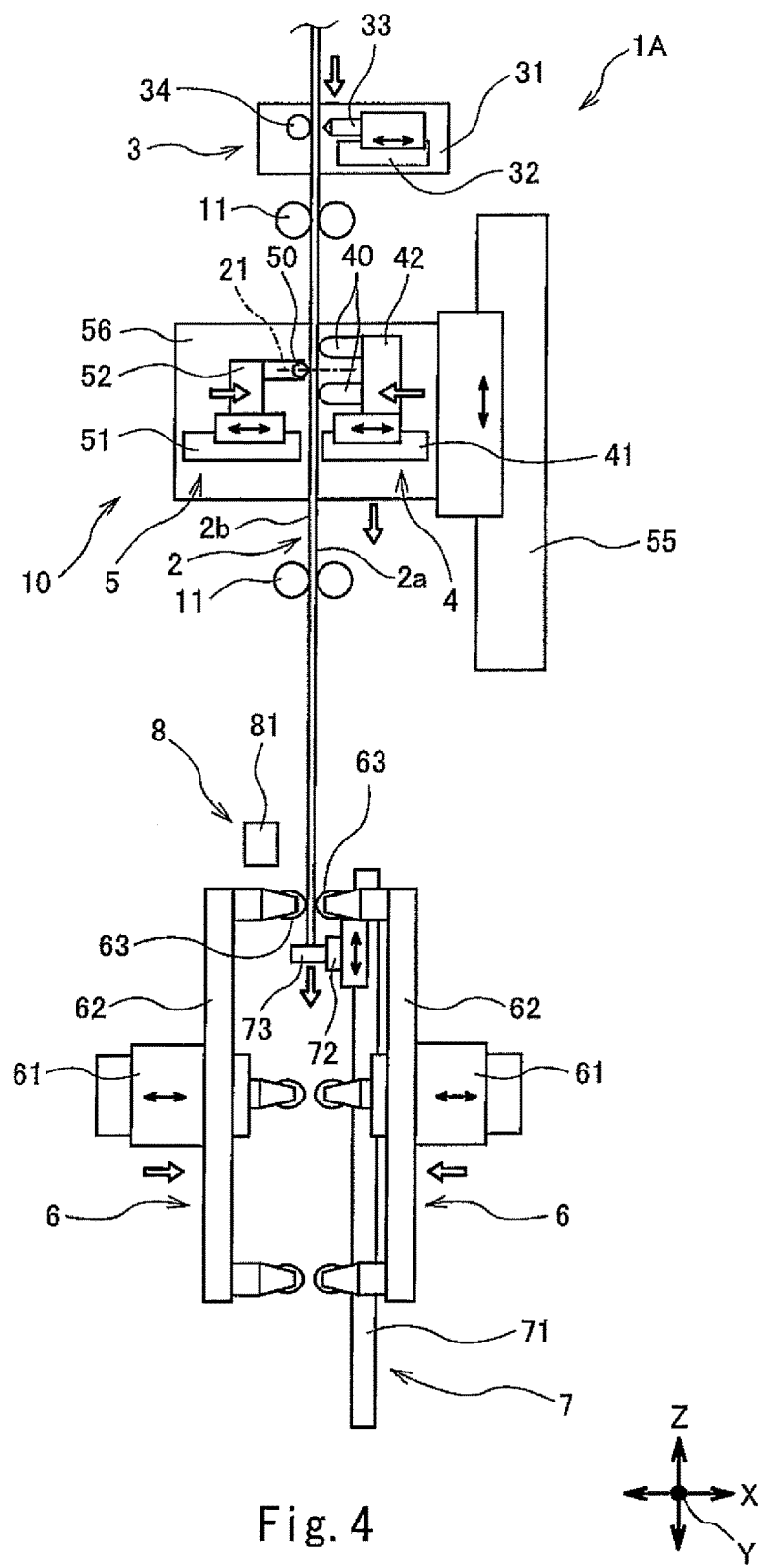
FIG. 4 shows an operation of the glass plate separating apparatus shown in FIG. 1.

At the same time as the Z-axis mechanism 55 lowers the heater 50 and the holding members 40, the Z-axis mechanism 71 of the retainer 7 lifts the supporting members 73 as shown in FIG. 3, and when the supporting members 73 have come into contact with the lower end of the glass ribbon 2, immediately lowers the supporting members 73 together with the glass ribbon 2 as shown in FIG. 4. Accordingly, when the glass ribbon 2 is divided, the glass plate 25 separated from the glass ribbon 2 by the division is immediately supported by the supporting members 73.

(3) Glass Plate Discharging Step

When, before, or after the divider 10 divides the glass ribbon 2, the movable part of the Y-axis mechanism 81 of the discharger 8 moves to a position where the chuck devices 82 provided on the movable part can chuck the glass plate 25, as shown in FIG. 5. When or before the divider 10 divides the glass ribbon 2, the pair of guide mechanisms 6 moves to the guide positions.

Figure 6:
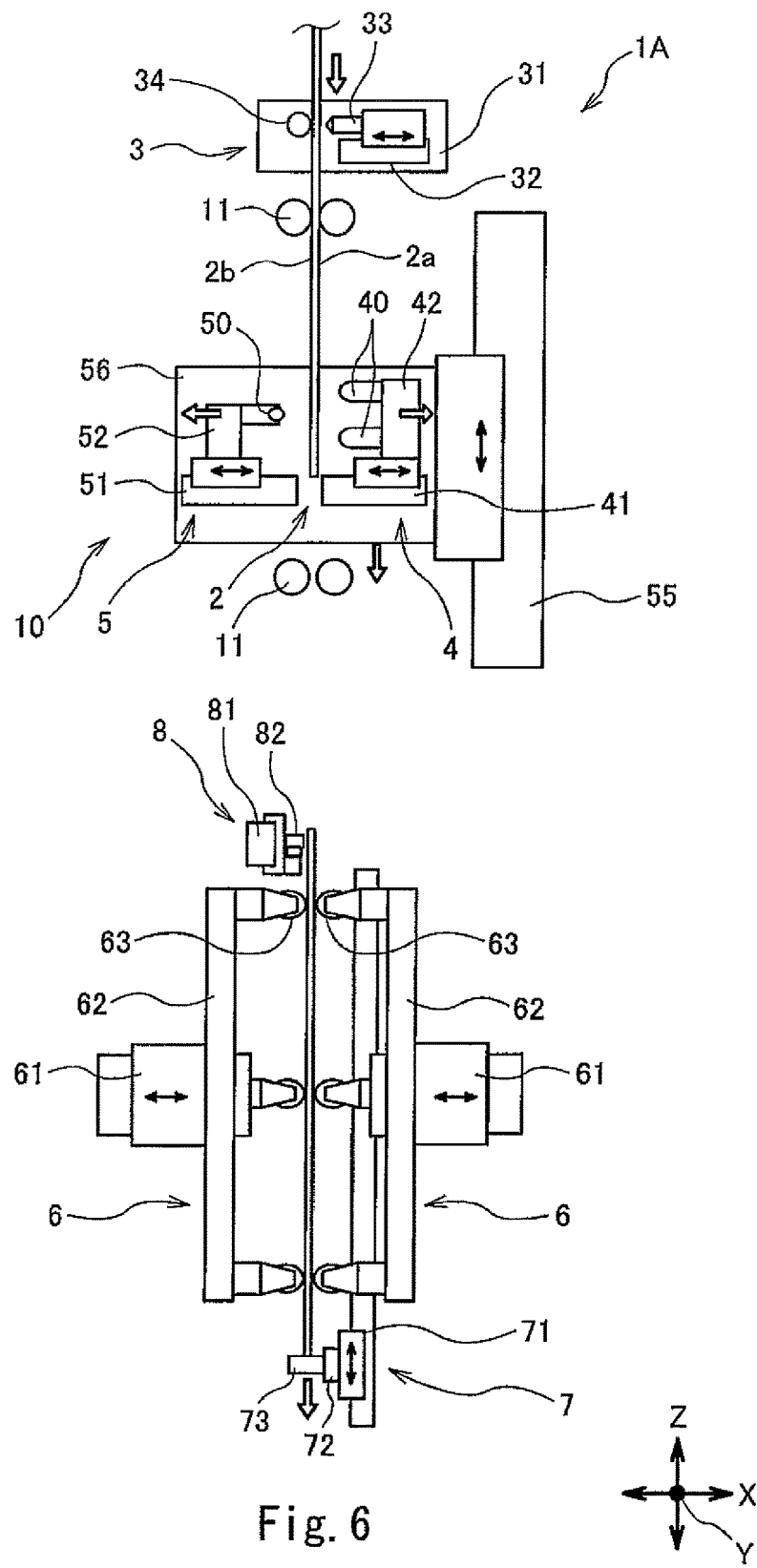
FIG. 6 shows an operation of the glass plate separating apparatus shown in FIG. 1.

Thereafter, as shown in FIG. 6, the Z-axis mechanism 71 of the retainer 7 lowers the supporting members 73 and the glass plate 25 supported thereon at a higher speed than the falling speed of the glass ribbon 2. During the lowering, the glass plate 25 is guided by the pair of guide mechanisms 6. When the glass plate 25 has been separated from the glass ribbon 2, the X-axis mechanisms 51 of the second driver 5 move the heater 50 backward, and the X-axis mechanisms 41 of the first driver 4 move the holding members 40 backward.

Figure 7:
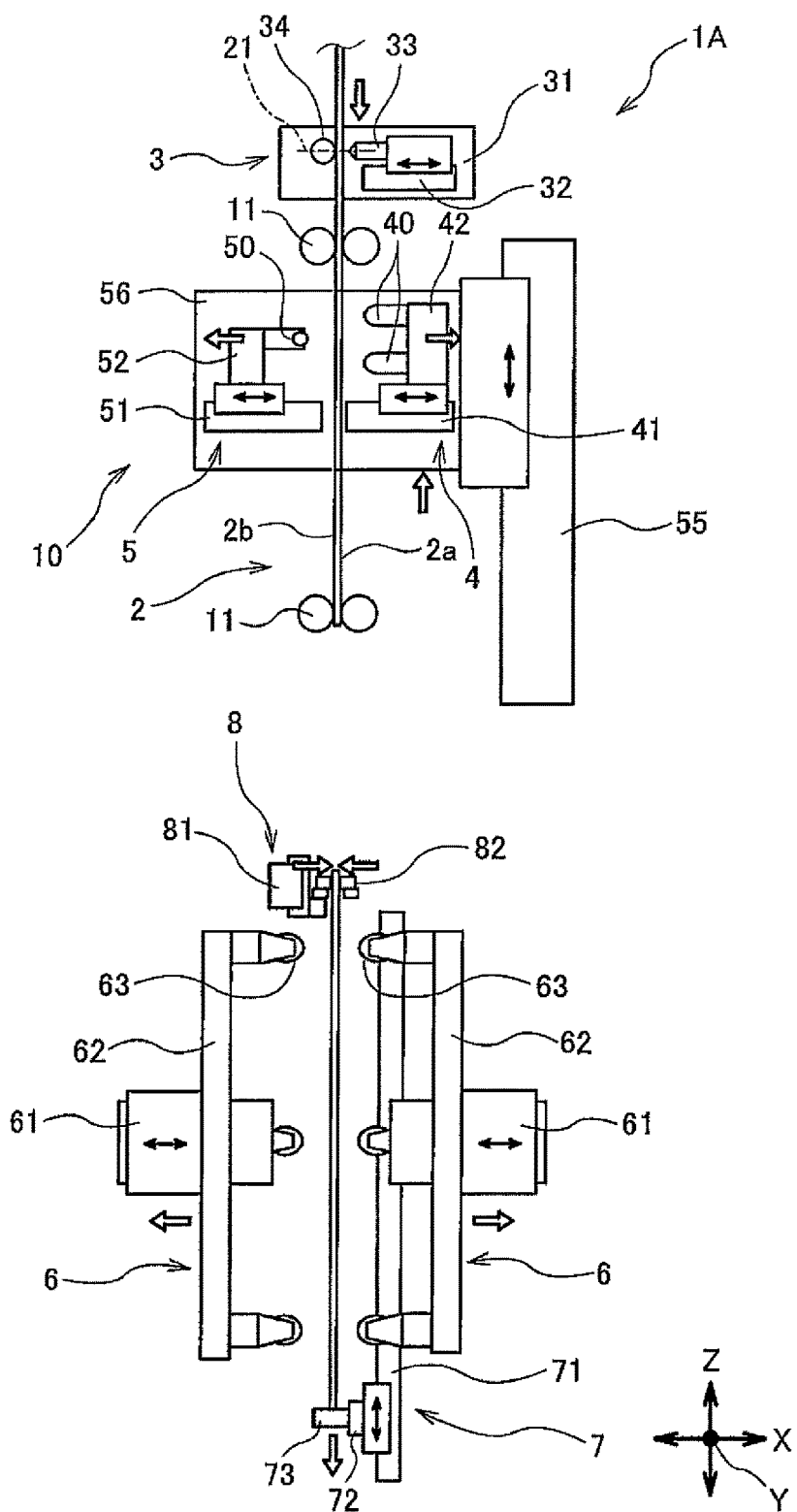
FIG. 7 shows an operation of the glass plate separating apparatus shown in FIG. 1.

Subsequently, as shown in FIG. 7, the chuck devices 82 of the discharger 8 chuck the glass plate 25. Then, the X-axis mechanisms 61 of the guide mechanisms 6 move the guide mechanisms 6 to the retraction positions, and the Z-axis mechanism 71 of the retainer 7 slightly lowers the supporting members 73. As a result, the glass plate 25 is suspended from the discharger 8. Thereafter, the discharger 8 discharges the glass plate 25 to a downstream line from directly below the glass ribbon 2. When the heater 50 and the holding members 40 have moved backward, the Z-axis mechanism 55 lifts the heater 50 and the holding members 40.

As described above, the glass plate separating apparatus 1A according to the present embodiment is capable of separating the glass plate 25 from the glass ribbon 2 without forming a scoring line on the glass ribbon 2. Therefore, the glass plate separating apparatus 1A can be realized with a very simply configuration. Moreover, unlike conventional glass plate separating apparatuses, the glass plate separating apparatus 1A does not require a mechanical cutter. Since the glass plate separating apparatus 1A does not include such a nondurable component, the glass plate separating apparatus 1A can be used semi-permanently. Since the glass plate separating apparatus 1A uses no mechanical cutter, cullet is not generated, which makes it possible to obtain a clean glass plate.

Further, since the glass plate separating apparatus 1A can divide the glass ribbon 2 apart instantly, the glass plate separating apparatus 1A can be suitably used in a high-speed glass plate production line. Since the dividing method according to the present embodiment does not cause chipping or cracks on the divided end face of the glass ribbon 2, the glass plate 25 with high strength can be obtained.

Still further, in the present embodiment, the retainer 7 lowers the glass plate 25 at a higher speed than the falling speed of the glass ribbon 2. This makes it possible to move the separated glass plate 25 away from the glass ribbon 2 immediately.

Still further, in the present embodiment, the glass plate 25 can be lowered at a high speed owing to the guiding by the pair of guide mechanisms 6. Also, by moving the guide mechanisms 6 to the retraction positions, the glass plate 25 can be discharged by the discharger 8.

<Variations>

It is not essential that the trigger device 3 be disposed above the divider 10. Alternatively, the trigger device 3 may be incorporated into the divider 10 such that the trigger device 3 faces the heater 50 (more specifically, disposed between the pair of holding members 40). In this case, the trigger device 3 is lowered in synchronization with the glass ribbon 2. Accordingly, a linear flaw extending in the Y-direction can be formed. In this case, however, the trigger device 3 needs to be provided with a Y-directional micromovement mechanism.

In a case where the glass plate 25 is thin and there is a risk of buckling of the glass plate 25 when it is supported from below, the retainer 7 may be configured to adhere, by suction, to the edges of the glass plate 25 in the Y-direction (the edges are to be cut away and discarded in a subsequent step), and lower the glass plate 25 in such a state.

Embodiment 2

Figure 12:
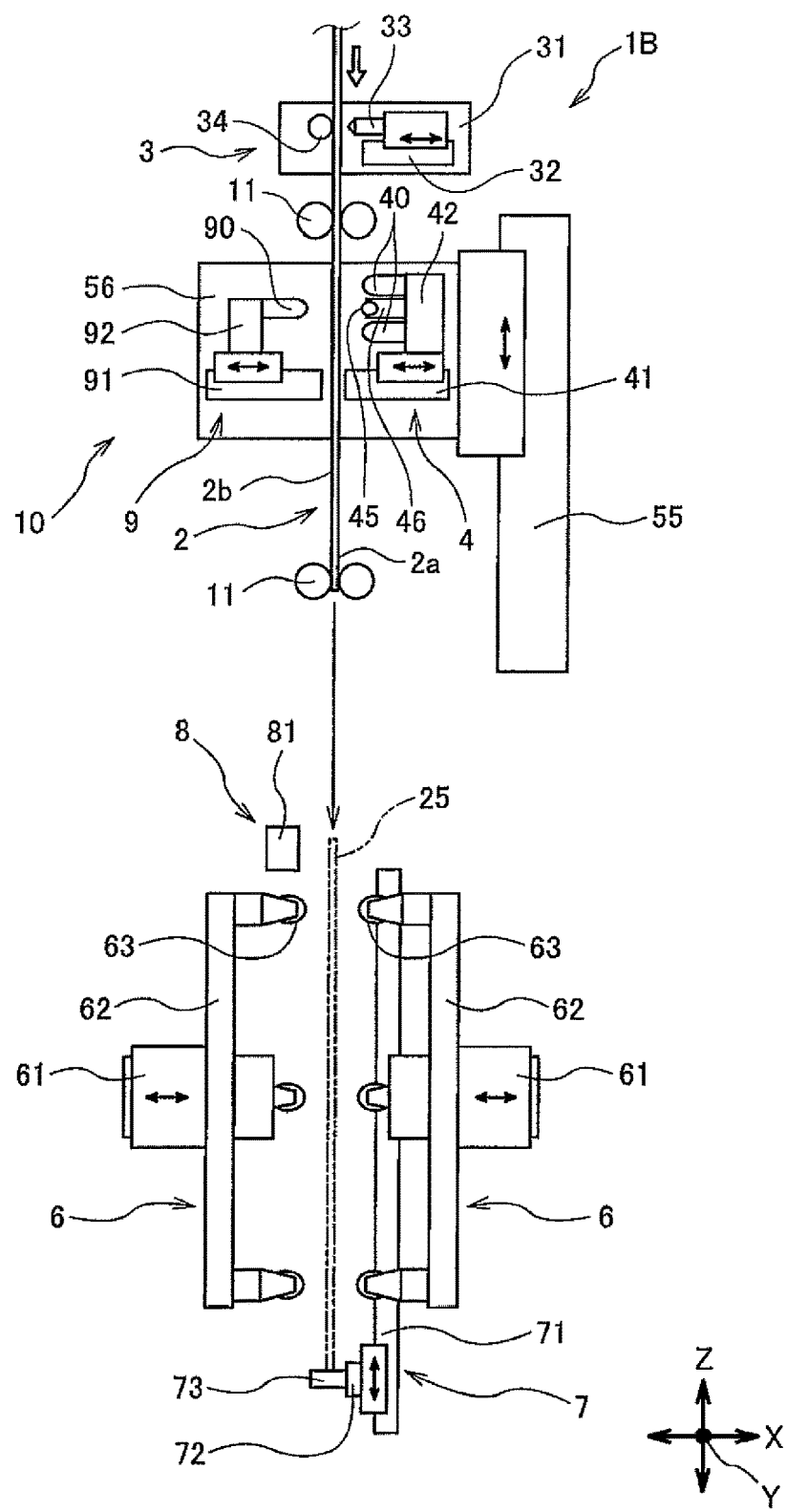
FIG. 12 is a side view of a glass plate separating apparatus according to Embodiment 2 of the present invention.
Figure 13:
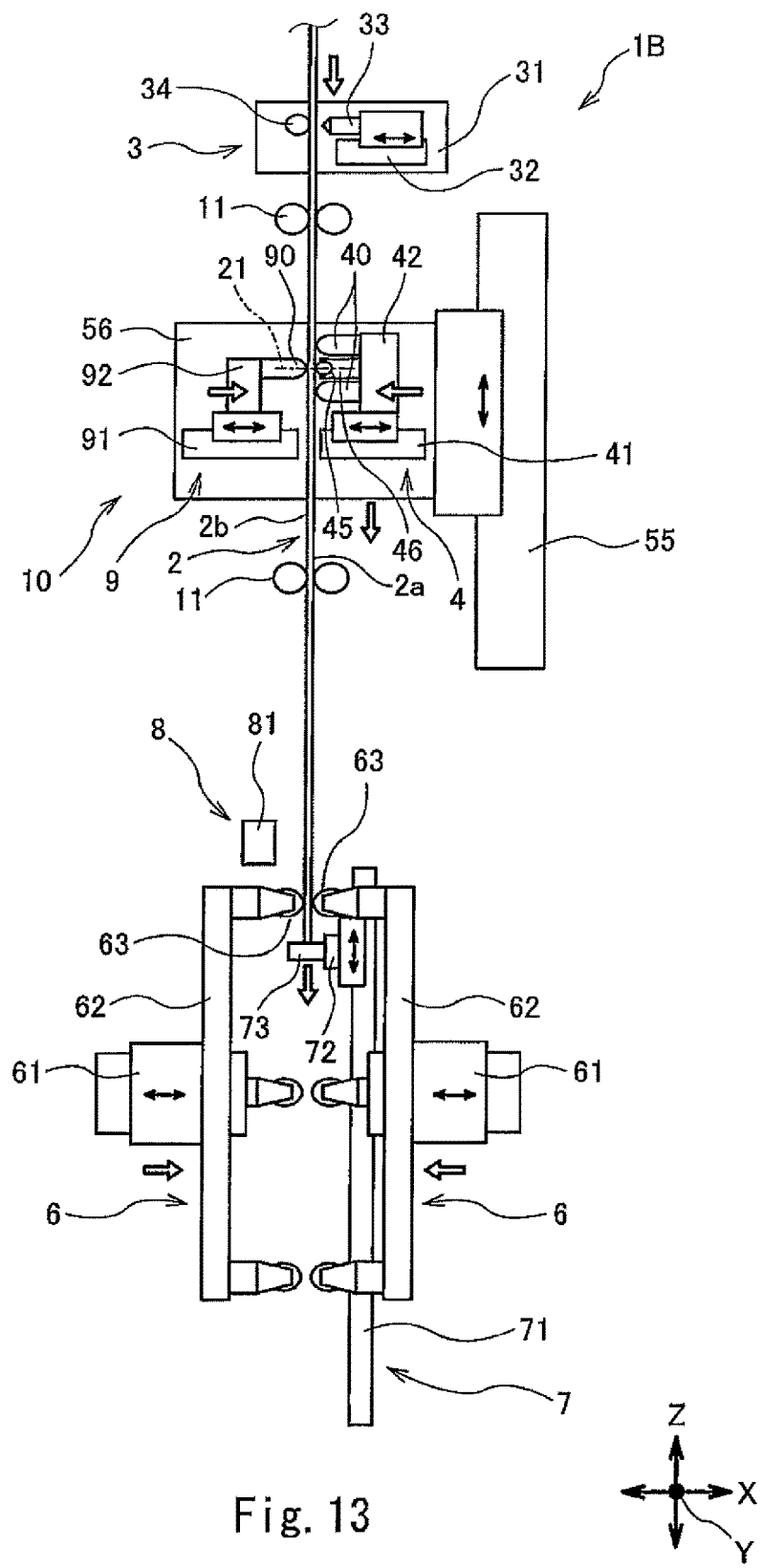
FIG. 13 shows an operation of the glass plate separating apparatus shown in FIG. 12.

Next, with reference to FIG. 12 and FIG. 13, a glass plate separating apparatus 1B according to Embodiment 2 of the present invention is described. It should be noted that, in the present embodiment and the following Embodiment 3, the same components as those described in Embodiment 1 are denoted by the same reference signs as those used in Embodiment 1, and repeating the same descriptions is avoided.

In the present embodiment, the divider 10 includes a cooling device 45, which cools down the glass ribbon 2. The cooling device 45 is disposed between the pair of holding members 40, and is positioned at the center between the holding members 40 in the Z-direction. The divider 10 further includes a pressing member 90, which is disposed at the second main surface 2b side of the glass ribbon 2. The divider 10 further includes a second driver 9 driving the pressing member 90 in addition to the first driver 4 driving the holding members 40.

As previously described in Embodiment 1, the first driver 4 includes the two X-axis mechanisms 41 and the Z-axis mechanism 55. The supporting member 42, which supports the holding members 40, is provided in a manner to bridge between the movable parts of the X-axis mechanisms 41. However, also in the present embodiment, only one X-axis mechanism 41 may be alternatively provided between the supporting member 42 and the Z-axis mechanism 55.

The cooling device 45 extends along the division-planned line 21 (i.e., in the Y-direction). The cooling device 45 is configured to keep its temperature to be lower than the temperature of the glass ribbon 2. For example, since the temperature of the glass ribbon 2 is, as one example, about 100 to 300° C. as mentioned above in Embodiment 1, the temperature of the cooling device 45 is, as one example, about 20 to 100° C. In one example, the temperature difference between the cooling device 45 and the glass ribbon 2 is 100° C. or more. As one example, a cylindrical body within which a coolant circulates can be used as the cooling device 45. Examples of the coolant include cooling water, cooling air containing sublimated gas from dry ice, liquid nitrogen, and a refrigerant.

The cooling device 45 is attached to the supporting member 42 via an X-axis mechanism 46, which allows the cooling device 45 to move in the X-direction. That is, the cooling device 45 is moved together with the holding members 40 in the X-direction by the X-axis mechanisms 41, and moved together with the holding members 40 in the Z-direction by the Z-axis mechanism 55. The X-axis mechanism 46 moves the cooling device 45 between a normal position, at which an end portion of the cooling device 45 at the glass ribbon 2 side and the distal ends of the pair of holding members 40 are positioned on the same plane, and a position that is distant from the glass ribbon 2 than the normal position. The X-axis mechanism 46 is, for example, an expanding and contracting component in which an urging member such as a spring is used. Alternatively, any of various actuators can be used as the X-axis mechanism 46.

The pressing member 90 extends along the division-planned line 21 (i.e., in the Y-direction). The pressing member 90 is intended to press the glass ribbon 2 against the cooling device 45, and is positioned at the center between the pair of holding members 40 in the Z-direction.

Similar to the second driver 5 driving the heater 50, which is described in Embodiment 1, the second driver 9 driving the pressing member 90 includes: two X-axis mechanisms 91, which move the pressing member 90 in the X-direction; and the Z-axis mechanism 55, which moves the pressing member 90 in the Z-direction. That is, the Z-axis mechanism 55 is shared by the first driver 4 and the second driver 9. However, as an alternative, a Z-axis mechanism dedicated for the second driver 9 may be disposed at the second main surface side of the glass ribbon 2. In this case, only one X-axis mechanism 91 may be provided between the Z-axis mechanism and a supporting member 92 described below.

Any of various linear motion mechanisms, such as a ball screw mechanism or hydraulic or pneumatic cylinder, can be used as each of the X-axis mechanisms 91. In the present embodiment, the X-axis mechanisms 91 are attached to the pair of arms 56. The supporting member 92, which supports the pressing member 90, is provided in a manner to bridge between movable parts of the X-axis mechanisms 91.

Next, operations of the glass plate separating apparatus 1B are described. It should be noted that since a start point flaw forming step and a glass plate discharging step in Embodiment 2 are the same as those described in Embodiment 1, only a dividing step is described below with reference to FIG. 13.

When the division-planned line 21 has coincided with the height position of the cooling device 45, the Z-axis mechanism 55 shared by the first driver 4 and the second driver 9 lowers the cooling device 45, the pair of holding members 40, and the pressing member 90 together with the glass ribbon 2 (i.e., at the same speed as the falling speed of glass ribbon 2). Further, the X-axis mechanisms 41 of the first driver 4 move the holding members 40 and the cooling device 45 forward to bring the holding members 40 into contact with the first main surface 2a of the glass ribbon 2 at both sides of the division-planned line 21 and bring the cooling device 45 into contact with the first main surface 2a of the glass ribbon 2 on the division-planned line 21.

When the cooling device 45 has come into contact with the first main surface 2a of the glass ribbon 2, the first main surface 2a is cooled down along the division-planned line 21. As a result, owing to a temperature difference between the first main surface 2a and the second main surface 2b, a tensile thermal stress derived from thermal contraction is generated on the first main surface 2a along the division-planned line 21, and a compressive thermal stress derived from reaction force of the thermal contraction is generated on the second main surface 2b.

Subsequently, while the temperature difference between the first main surface 2a and the second main surface 2b of the glass ribbon 2 is kept great, i.e., before the temperature of the second main surface 2b becomes close to the temperature of the first main surface 2a due to thermal conduction, the X-axis mechanisms 91 of the second driver 9 move the pressing member 90 forward to press the pressing member 90 onto the glass ribbon 2 on the division-planned line 21. As a result, a bending moment is caused to act on the glass ribbon 2, and on the first main surface 2a, a tensile stress derived from the bending moment is combined with the tensile thermal stress, which results from the thermal contraction. Consequently, a crack progresses along the division-planned line 21 from the start point flaw 22 formed in the first main surface 2a, and the glass ribbon 2 is divided along the division-planned line 21. In addition, owing to these stresses, the glass ribbon 2 is divided apart instantly (e.g., in about 1 to 3 seconds).

Operations performed thereafter in the dividing step are the same as those described in Embodiment 1.

Also in the present embodiment, the same advantageous effects as those of Embodiment 1 can be obtained.

Embodiment 3

Figure 14:
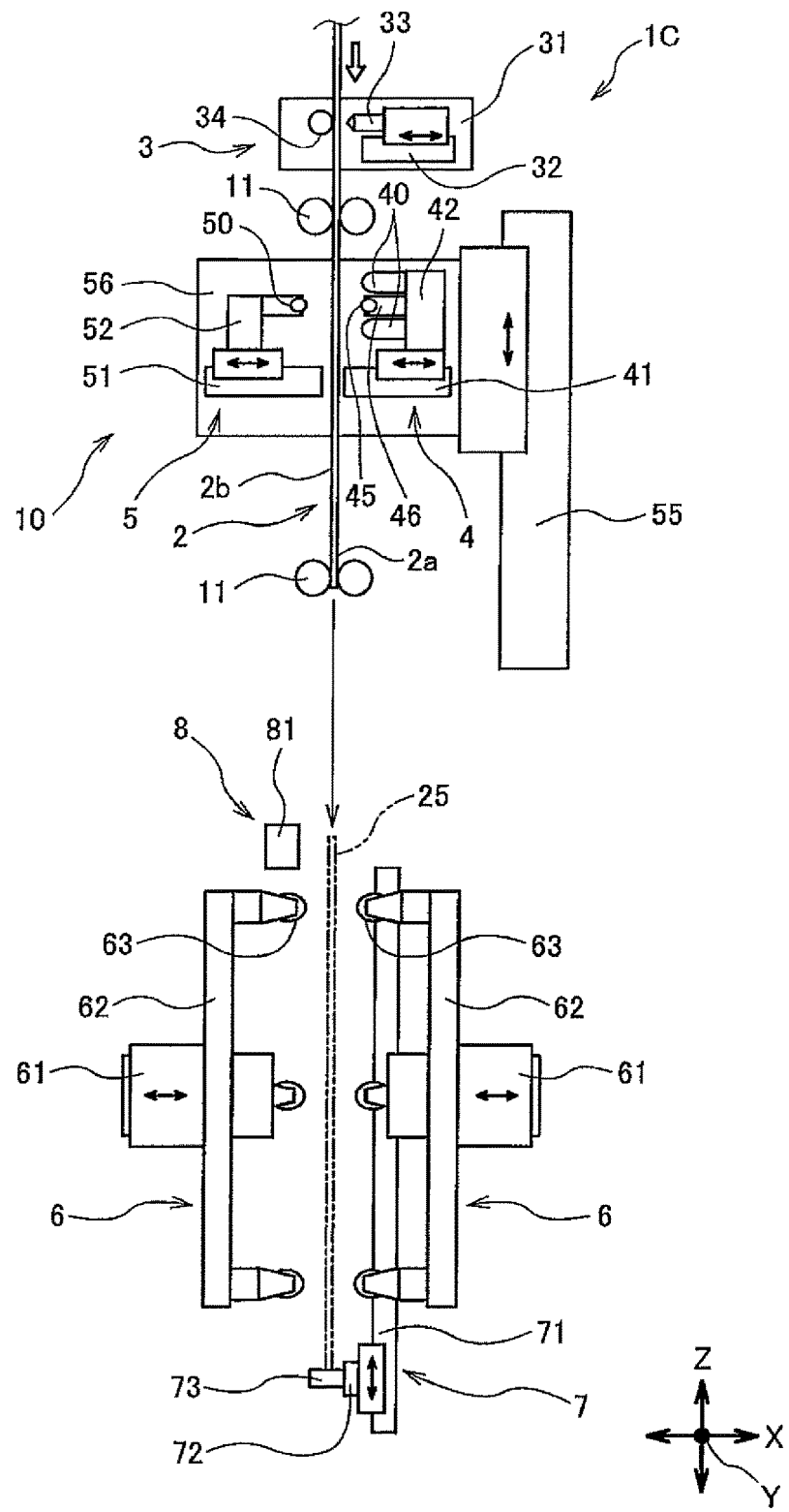
FIG. 14 is a side view of a glass plate separating apparatus according to Embodiment 3 of the present invention.
Figure 15:
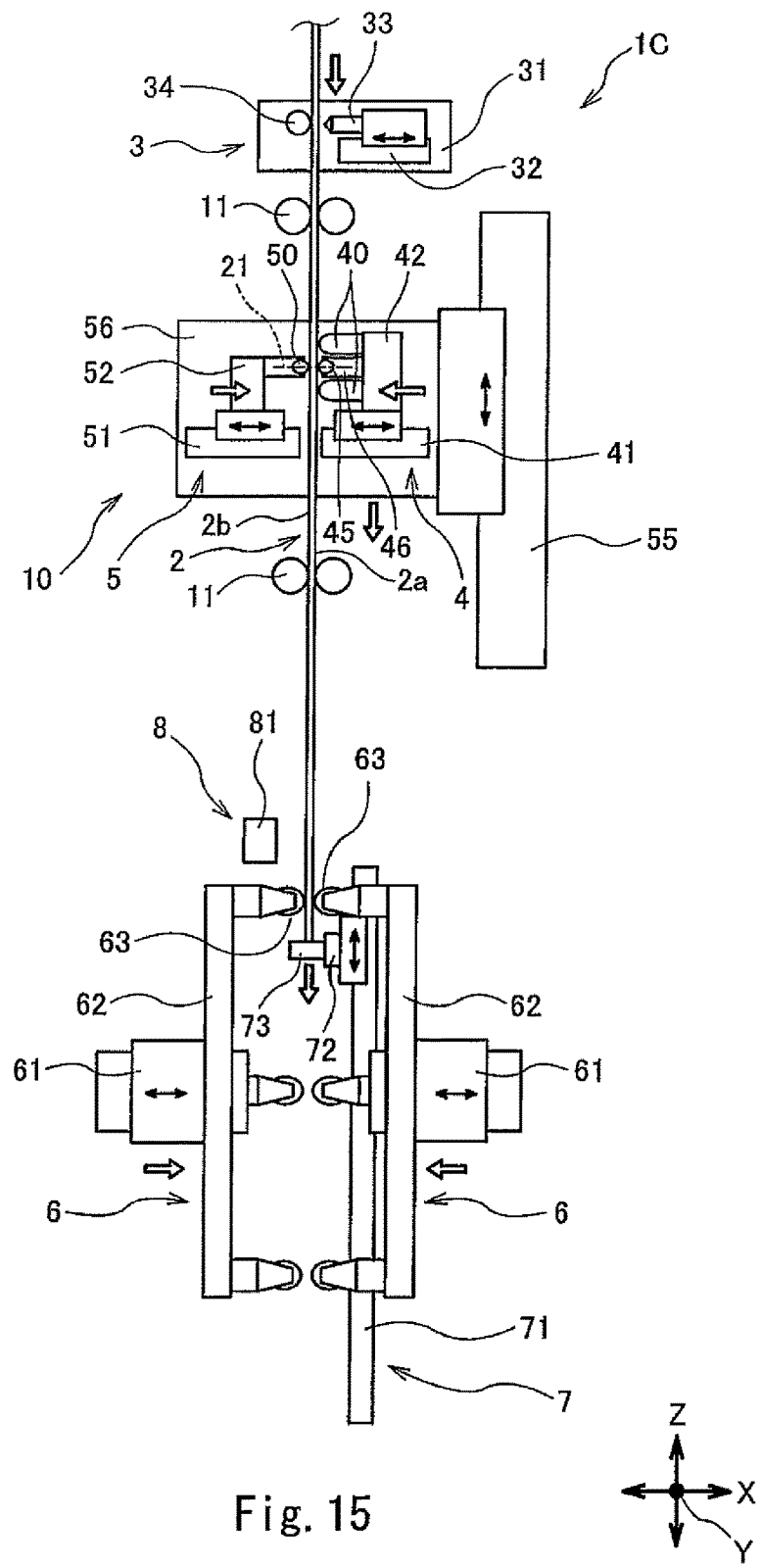
FIG. 15 shows an operation of the glass plate separating apparatus shown in FIG. 14.

Next, with reference to FIG. 14 and FIG. 15, a glass plate separating apparatus 1C according to Embodiment 3 of the present invention is described. The glass plate separating apparatus 1C has a configuration in which the heater 50 of Embodiment 1 and the cooling device 45 of Embodiment 2 are combined. That is, the heater 50 doubles as the pressing member 90 of Embodiment 2.

According to this configuration, a temperature gradient between the second main surface 2b and the first main surface 2a of the glass ribbon 2 can be made steep, and thereby a greater tensile thermal stress can be generated.

Other Embodiments

The present invention is not limited to the above-described embodiments. Various modifications can be made without departing from the spirit of the invention.

Figure 16:
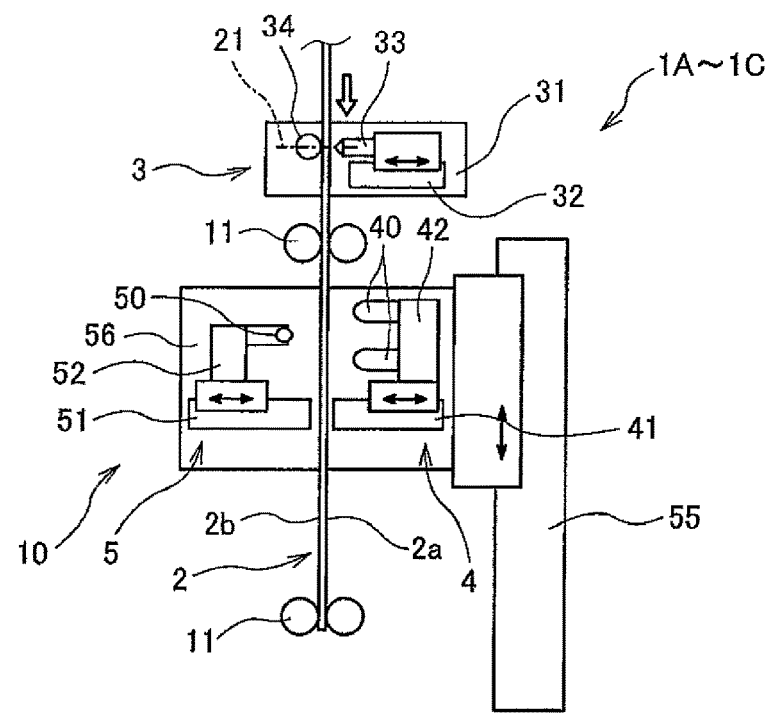
FIG. 16 shows a variation of a discharger.
Figure 16:
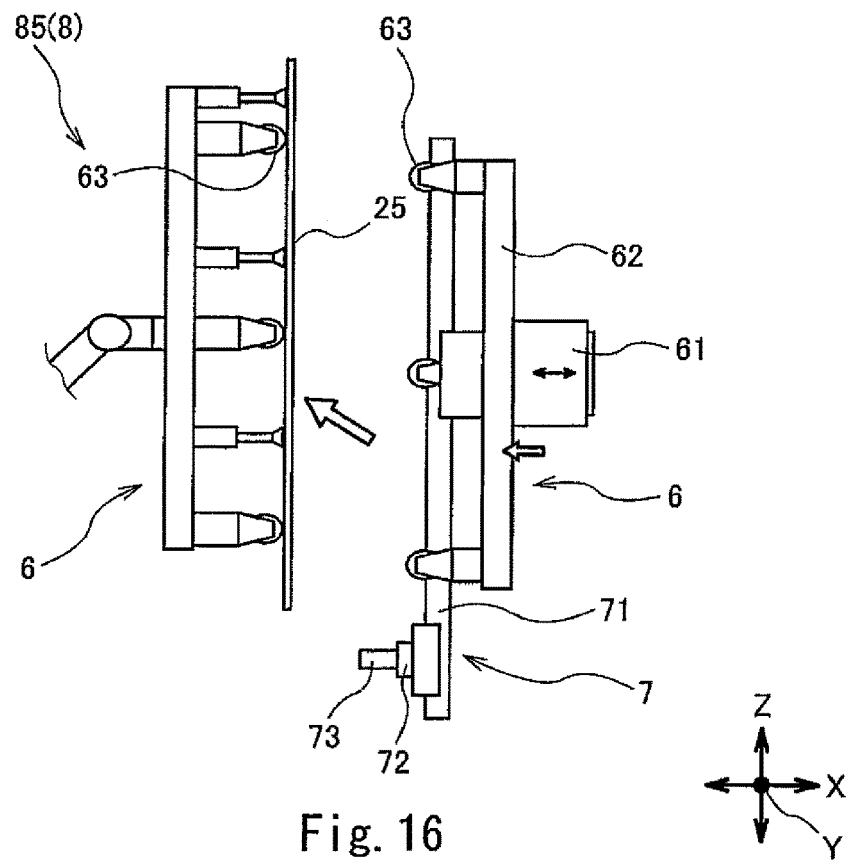
Figure 17:
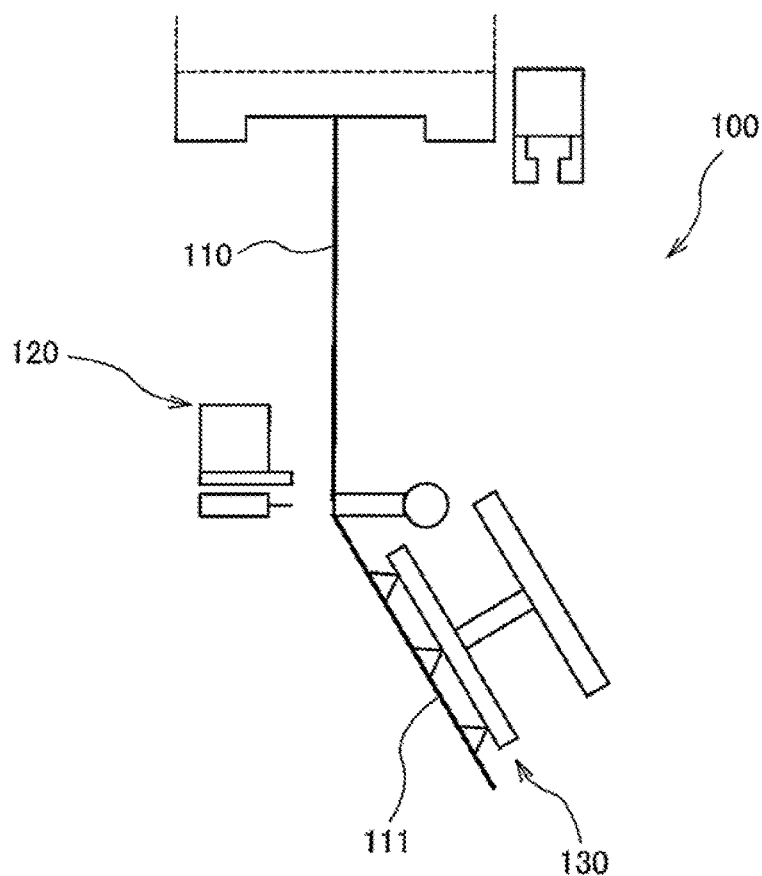
FIG. 17 is a side view of a conventional glass plate separating apparatus.

For example, instead of the Y-axis mechanism 81 described in Embodiment 1, an articulated robot 85 with a suction hand as shown in FIG. 16 can be used as the discharger 8. In this case, one of the guide mechanisms 6 can be incorporated into the suction hand of the articulated robot 85. In the case of using the articulated robot 85, a floating device may be interposed between the suction hand and the distal arm so that the suction hand can move linearly following the falling of the glass ribbon 2.

INDUSTRIAL APPLICABILITY

The present invention is particularly useful for the production of a high-quality glass plate, such as a glass plate for a flat panel display or the like.

REFERENCE SIGNS LIST 1A to 1C glass plate separating apparatus
2 glass ribbon
2a first main surface
2b second main surface
21 division-planned line
22 start point flaw
25 glass plate
3 trigger device
4 first driver
40 holding member
45 cooling device
5 second driver
50 heater
6 guide mechanism
7 retainer
8 discharger
9 second driver
90 pressing member

The invention claimed is:

1. A glass plate separating apparatus for separating a glass plate from a glass ribbon obtained by a down-draw technique, the glass plate separating apparatus comprising:
a trigger device that forms a start point flaw in a first main surface of the glass ribbon on a division-planned line;
a pair of holding members disposed at the first main surface side of the glass ribbon, each holding member extending parallel to the division-planned line;
a first driver that brings the pair of holding members into contact with the glass ribbon at both sides of the division-planned line while lowering the pair of holding members together with the glass ribbon;
a heater disposed at a second main surface side of the glass ribbon, the second main surface facing opposite the first main surface, the heater extending along the division-planned line;
a second driver that, while lowering the heater together with the glass ribbon, brings the heater into contact with the glass ribbon on the division-planned line such that a tensile thermal stress is generated on the first main surface of the glass ribbon, and presses the heater onto the glass ribbon such that a tensile stress derived from a bending moment and the tensile thermal stress are combined on the first main surface of the glass ribbon to divide the glass ribbon along the division-planned line; and
a discharger that discharges the glass plate separated from the glass ribbon as a result of dividing the glass ribbon from directly below the glass ribbon.

2. The glass plate separating apparatus according to claim 1, further comprising:
a cooling device disposed between the pair of holding members and extending along the division-planned line, the cooling device being brought into contact with the glass ribbon on the division-planned line when the heater is brought into contact with the glass ribbon.

3. The glass plate separating apparatus according to claim 2, further comprising:
a retainer that retains the separated glass plate and lowers the separated glass plate at a higher speed than a falling speed of the glass ribbon, wherein
the discharger discharges the glass plate lowered by the retainer.

4. The glass plate separating apparatus according to claim 3, further comprising:
a pair of guide mechanisms that guides the glass plate when the glass plate is lowered by the retainer, the guide mechanisms moving between guide positions at which the guide mechanisms contact the glass plate and retraction positions at which the guide mechanisms are spaced apart from the glass plate.

5. The glass plate separating apparatus according to claim 1, further comprising:
a retainer that retains the separated glass plate and lowers the separated glass plate at a higher speed than a falling speed of the glass ribbon, wherein
the discharger discharges the glass plate lowered by the retainer.

6. The glass plate separating apparatus according to claim 5, further comprising:
a pair of guide mechanisms that guides the glass plate when the glass plate is lowered by the retainer, the guide mechanisms moving between guide positions at which the guide mechanisms contact the glass plate and retraction positions at which the guide mechanisms are spaced apart from the glass plate.

7. A glass plate separating apparatus for separating a glass plate from a glass ribbon obtained by a down-draw technique, the glass plate separating apparatus comprising:
a trigger device that forms a start point flaw in a first main surface of the glass ribbon on a division-planned line;
a pair of holding members disposed at the first main surface side of the glass ribbon, each holding member extending parallel to the division-planned line;
a first driver that brings the holding members into contact with the glass ribbon at both sides of the division-planned line while lowering the holding members together with the glass ribbon;

a pressing member disposed at a second main surface side of the glass ribbon, the second main surface facing opposite the first main surface, the pressing member extending along the division-planned line;

a cooling device disposed between the pair of holding members and extending along the division-planned line, the cooling device being brought into contact with the glass ribbon on the division-planned line to generate a tensile thermal stress on the first main surface of the glass ribbon;

a second driver that, while lowering the pressing member together with the glass ribbon, presses the pressing member onto the glass ribbon on the division-planned line such that a tensile stress derived from a bending moment and the tensile thermal stress are combined on the first main surface of the glass ribbon to divide the glass ribbon along the division-planned line; and a discharger that discharges the glass plate separated from the glass ribbon as a result of dividing the glass ribbon from directly below the glass ribbon.

8. The glass plate separating apparatus according to claim 7, further comprising:

a retainer that retains the separated glass plate and lowers the separated glass plate at a higher speed than a falling speed of the glass ribbon, wherein the discharger discharges the glass plate lowered by the retainer.

9. The glass plate separating apparatus according to claim 8, further comprising:

a pair of guide mechanisms that guides the glass plate when the glass plate is lowered by the retainer, the guide mechanisms moving between guide positions at which the guide mechanisms contact the glass plate and retraction positions at which the guide mechanisms are spaced apart from the glass plate.

* * * * *